US011831506B2

(12) United States Patent
Franklin et al.

(10) Patent No.: US 11,831,506 B2
(45) Date of Patent: Nov. 28, 2023

(54) TOUCHLESS PROVISIONING OF INFORMATION HANDLING SYSTEMS

(71) Applicant: Dell Products L.P., Round Rock, TX (US)

(72) Inventors: Jon Vernon Franklin, Pflugerville, TX (US); Chien Lin Lee, Round Rock, TX (US); Jun Gu, Austin, TX (US); Alaric Joaquim Narcissius Silveira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/727,203

(22) Filed: Apr. 22, 2022

(65) Prior Publication Data

US 2023/0344713 A1    Oct. 26, 2023

(51) Int. Cl.
*H04L 41/084* (2022.01)
*H04L 61/5014* (2022.01)
*H04L 12/18* (2006.01)

(52) U.S. Cl.
CPC ............ *H04L 41/084* (2013.01); *H04L 12/18* (2013.01); *H04L 61/5014* (2022.05)

(58) Field of Classification Search
CPC .... H04L 41/084; H04L 12/18; H04L 61/5014
See application file for complete search history.

(56) References Cited

U.S. PATENT DOCUMENTS

| 7,039,688 | B2* | 5/2006 | Matsuda | H04L 61/50 709/208 |
| 11,546,228 | B2* | 1/2023 | Schumaker | H04L 41/0866 |
| 2011/0158088 | A1* | 6/2011 | Lofstrand | H04L 41/5054 709/245 |
| 2015/0066979 | A1* | 3/2015 | Zhang | G06F 16/245 707/769 |
| 2017/0034274 | A1* | 2/2017 | Hanney | H04L 67/1097 |
| 2020/0287784 | A1* | 9/2020 | Lear | H04L 67/104 |
| 2022/0337544 | A1* | 10/2022 | Peng | H04L 61/5046 |

* cited by examiner

*Primary Examiner* — John M MacIlwinen
*Assistant Examiner* — Rachel J Hackenberg
(74) *Attorney, Agent, or Firm* — Jackson Walker L.L.P

(57) ABSTRACT

A disclosed touchless provisioning method configures a baseboard management controller (BMC) of a bare metal server to include or support two or more network services for retrieving a configuration profile locator (CPL) identifying a network-accessible configuration file containing a server configuration profile (SCP). At least one of the network services may be invoked to retrieve the CPL and pass the CPL to a provisioning agent process configured to access the configuration file and configure the system in accordance with the SCP. The server may require a static IP address and the two or more network services may include at least one network service, such as a multicast domain name service (mDNS), suitable for use in conjunction with a static IP address system and at least one network service, such as a DHCP service, suitable for use in conjunction with servers that do not require a static IP address.

14 Claims, 2 Drawing Sheets

```
# cat /etc/avahi/services/zt.service
<service-group>
  <name replace-wildcards="yes">%h</name>
  <service>
    <type>_zerotouchprovsrv._tcp</type>
    <txt-record>
      args=-f system_config.xml -i 192.168.1.1 -n firmware -s 2 -u mdnsuser -p password -d 1 -e 1
    </txt-record>
  </service>
</service-group>
```
401

TOUCHLESS PROVISIONING OF INFORMATION HANDLING SYSTEMS

TECHNICAL FIELD

The present disclosure relates to information handling systems and, more particularly, provisioning of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the field of server-class information handling systems, managing all aspects of a server's configuration can be extremely complex. Although automated provisioning solutions are available, such solutions may rely on services that may be unavailable or incompatible in specific instances. As an example, an automated provisioning service may leverage and require a dynamic host configuration protocol (DHCP) service to kick start an automated provisioning process by identifying a server configuration profile (SCP). While DHCP servers are widely implemented, some server configurations, including but not necessarily limited to servers requiring a static IP address, may not be compatible with or suitable for use in conjunction with a DHCP-dependent provisioning process.

SUMMARY

In accordance with teachings included herein, a disclosed method for touchless provisioning of an information handling system, such as but not limited to a bare metal, server-class information handling system, includes configuring the system to include or support two or more network services for retrieving a configuration profile locator that identifies a network-accessible configuration file containing an SCP. The disclosed method further includes invoking at least one of the network services to retrieve the configuration profile locator and pass the locator to a provisioning agent process that accesses the configuration file identified by the locator and configures the system in accordance with the SCP.

In at least some embodiments, the system to be provisioned includes a management controller such as a baseboard management controller, remote access controller, embedded controller, or the like, and the touchless provisioning operations are performed by this management controller. In such embodiments, configuring the system to include or support two or more network services is achieved by configuring the management controller to include or support two or more network services. In some embodiments, the system is associated with a static IP address and the two or more network services include at least one network service, such as a multicast domain name service (mDNS), suitable for use in conjunction with a static IP address system and at least one network service, such as a DHCP and/or a DHCPv6 service, suitable for use in conjunction with a dynamically assigned IP address system.

Thus, the two or more network services may include a DHCP service and an mDNS. In addition, invoking at least one of the two or more network services may include invoking the DHCP service and the mDNS to run concurrently. In at least some such embodiments, the DHCP service has priority relative to the mDNS service such that, the system, upon detecting the DHCP service retrieving the configuration profile locator before the mDNS service is invoked, may prevent the mDNS service from being invoked or halt the mDNS service if it has been invoked. The system may support multiple options for enabling disclosed touchless provisioning features. These options, which may include, as non-limiting examples, an enable-once option and an enable-once-after-reset option, may be specified via a provisioning feature enablement setting.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
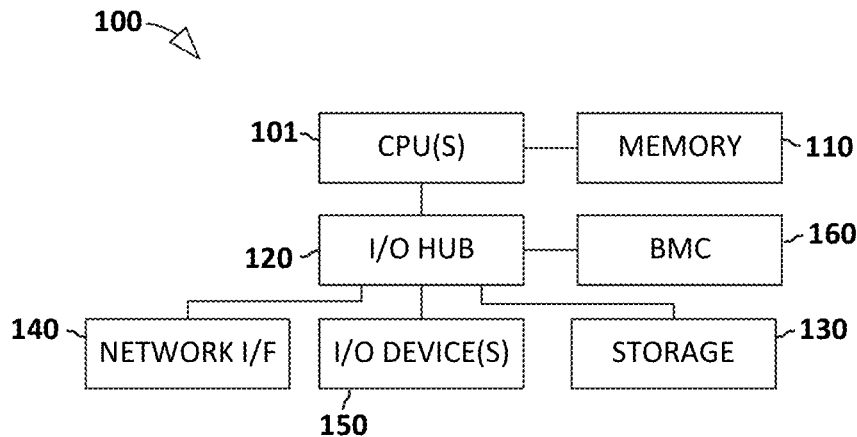
FIG. 1 illustrates an information handling system.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 2:
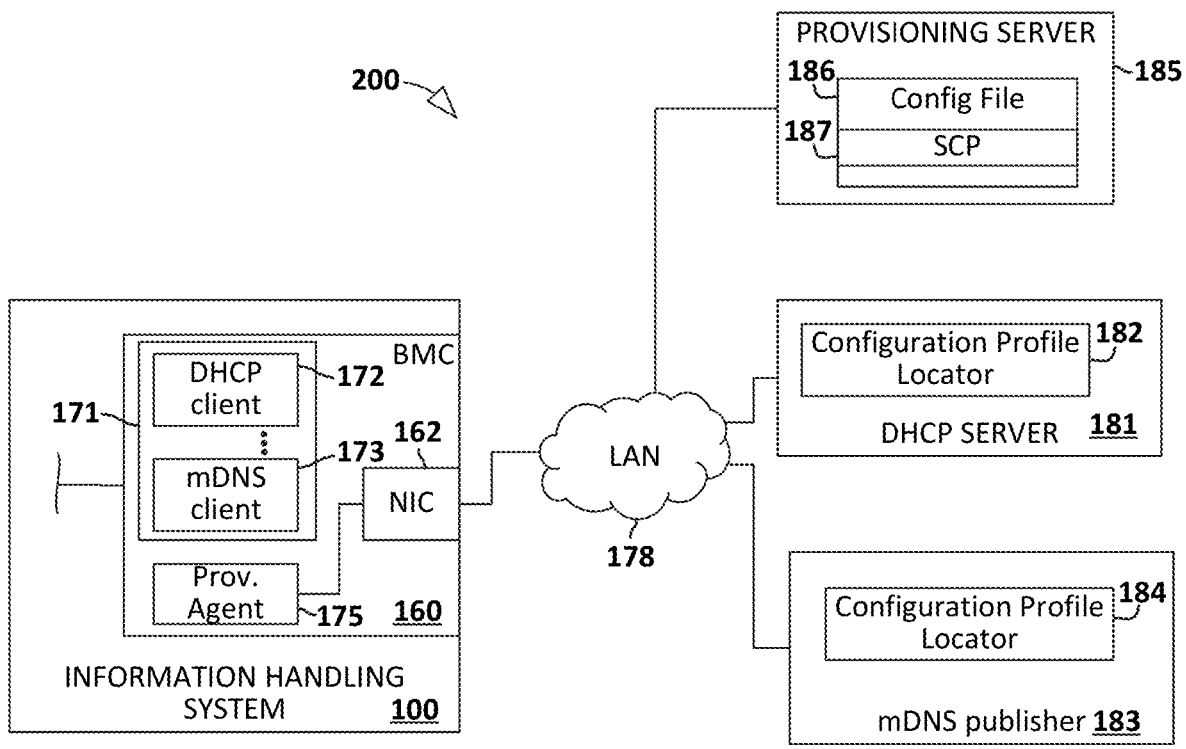
FIG. 2 illustrates an environment suitable for implementing touchless provisioning features in accordance with disclosed teachings.
Figures 3, 4:
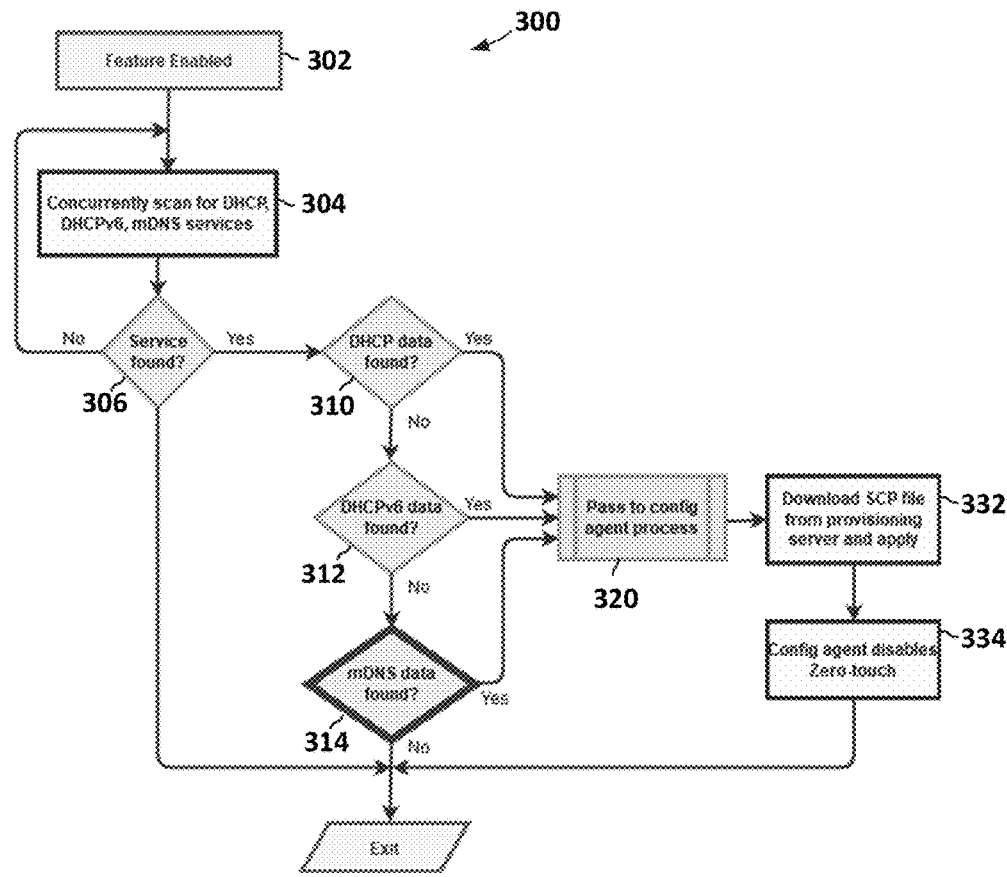
FIG. 3 illustrates a flow diagram of a method for implementing touchless provisioning features in accordance with disclosed teachings.
FIG. 4 illustrates an example mDNS service record.

Turning now to the drawings, FIG. 1 illustrates an example information handling system 100 that may be suitable for use in conjunction with touchless provisioning features described in FIG. 2 and FIG. 3.

The illustrated information handling system includes one or more general purpose processors or central processing units (CPUs) 101 communicatively coupled to a memory resource 110 and to an input/output hub 120 to which various I/O resources and/or components are communicatively coupled. The I/O resources explicitly depicted in FIG. 1 include a network interface 140, commonly referred to as a NIC (network interface card), storage resources 130, and additional I/O devices, components, or resources 150 including as non-limiting examples, keyboards, mice, displays, printers, speakers, microphones, etc. The illustrated information handling system 100 includes a baseboard management controller (BMC) 160 providing, among other features and services, an out-of-band management resource which may be coupled to a management server (not depicted). In at least some embodiments, BMC 160 may manage information handling system 100 even when information handling system 100 is powered off or powered to a standby state. BMC 160 may include a processor, memory, an out-of-band network interface separate from and physically isolated from an in-band network interface of information handling system 100, and/or other embedded information handling resources. In certain embodiments, BMC 160 may include or may be an integral part of a remote access controller (e.g., a Dell Remote Access Controller or Integrated Dell Remote Access Controller) or a chassis management controller.

Turning now to FIG. 2, an exemplary configuration for implementing a touchless provisioning service suitable for, but not necessarily limited to, provisioning a bare metal server, is presented. FIG. 2 depicts a touchless provisioning configuration 200 in which system 100, the system to be provisioned, includes a BMC 160 configured to support multiple services for retrieving a configuration profile locator (CPL) that may be passed to a provisioning agent process to provision system 100.

The touchless provisioning environment 200 depicted in FIG. 2 includes a local area network 178 coupling BMC 160 to various resources and services, including two or more services capable of providing a CPL that may be used to retrieve an SCP for provisioning system 100. In the touchless provisioning environment 200 illustrated in FIG. 2, a DHCP server 181, an mDNS publisher 183, and a provisioning server 185 are all coupled to LAN 178. The depicted provisioning server 185 includes a configuration file 186 containing an SCP 187. SCP 187 may be implemented as a human readable, e.g., XML or JSON, template indicating configuration settings for a specific server. In some embodiments, SCP 187 includes a name-value pair for each configurable setting. In addition to configuration settings, SCP 187 may indicate attributes that can trigger specific workflows like firmware updates and operating system deployment.

The touchless provisioning environment 200 illustrated in FIG. 2 includes two CPLs, each of which includes information identifying SCP 187. The two CPLs illustrated in FIG. 2 include a first CPL 182 stored on DHCP server 181 and a second CPL 184 stored on mDNS publisher 183. As suggested by its name, mDNS publisher 183 complies with a publically-disclosed mDNS protocol for resolving hostnames to IP addresses within small networks that may not include an explicit name server. mDNS employs programming interfaces and packet formats that are substantially similar to traditional unicast DNS.

As depicted in FIG. 2, BMC 160 includes a configuration discovery module 171 that supports two or more services for discovering connection information for a provisioning server such as the provisioning server 185. The configuration discovery module 171 depicted in FIG. 2 includes a DHCP client module 172 and an mDNS client module 173. DHCP client module 172, as suggested by its name, is suitable for issuing DHCP requests to discover DHCP servers, including DHCP server 181, on LAN 178. Similarly, the mDNS client module 173 enables BMC 160 to discover mDNS publishers, including mDNS publisher 183, on LAN 178. In at least some embodiments, configuration discovery module 171 may be configured to support concurrent CPL discovery requests. For purposes of this disclosure concurrent requests include any two requests that are pending at the same time. For example, configuration discovery module 171 may invoke DHCP client 172 and mDNS client 173 wherein CPL requests from both clients are pending at the same time.

While FIG. 2 illustrates an environment 200 that includes 2 CPLs, one of which is stored on a DHCP server and the other of which is stored on an mDNS publisher, it will be appreciated by those of ordinary skill in the field that other implementations may include additional CPLs associated with other suitable resources and services. In addition, although FIG. 2 illustrates mDNS publisher 183 as distinct from provisioning server 185, provisioning server 185 may be configured as an mDNS publisher that includes a suitable CPL.

Turning now to FIG. 3, an exemplary method 300 for implementing touchless provisioning of an information handling system is illustrated in flow diagram format. In at least some embodiments, system 100 is a bare metal server and method 300 is performed by BMC 160 to provision the metal server in accordance with a configuration defined by an SCP.

The method 300 illustrated in FIG. 3 begins with the enablement (operation 302) of the touchless provisioning feature. Embodiments may support two or more enablement options such as enable-once or enable-once-after-reset. The illustrated method 300 then performs a concurrent scan (operation 304) for various services including, in the depicted example, a DHCP service, a DHCPv6 service, and an mDNS service. As indicated previously, however, other embodiments may employ more or fewer and/or different services for locating and retrieving the configuration profile.

If, in operation 306, any one or more of the requested services is found, the illustrated method 300 proceeds to a prioritized sequence for invoking one or more of the identified services. Specifically, the implementation illustrated in FIG. 3 prioritizes the available services with the DHCP service prioritized first, the DHCPv6 service prioritized second, and the mDNS service prioritized third. Although the illustrated prioritization may be preferable for particular use cases, such as when a majority of the servers provisioned are configured to use a dynamically-assigned IP address received from a DHCP server, other implementations may use a different prioritization. In this configuration, if, in block 310, a reply to the DHCP request issued by BMC 160 includes CPL data, method 300 proceeds to operation 320 to pass the DHCP-provided CPL data to the provisioning agent process. If no DHCP data is found in operation 310, the illustrated method 300 proceeds to operation 312, to determine whether DHCPv6 data was found and, if so, proceeds to operation 320 to pass the DHCPv6 data to the provisioning agent process. If no DHCPv6 data was found in operation 312, the illustrated method 300 proceeds to operation 314 to determine whether mDNS data was found. Turning momentarily to FIG. 4, an exemplary mDNS service record 400 is illustrated. The illustrated record 400 includes an exemplary CPL 401 identifying an SCP with filename system_config.xml. Returning to FIG. 3, if mDNS data is found in operation 314, method 300 again proceeds to operation 320 to pass the mDNS data to the provisioning agent process.

After passing the applicable data to the provisioning agent process, method 300 proceeds to operation 332 in which the provisioning agent downloads the SCP file from the provisioning server and applies the applicable configurations settings to system 100. After provisioning system 100, the provisioning disables the touchless provisioning feature in operation 334.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for provisioning an information handling system, wherein the method comprises:
configuring the system to include or support two or more network services for retrieving a configuration profile locator identifying a network-accessible configuration file containing a server configuration profile (SCP), wherein the two or more network services include a dynamic host configuration protocol (DHCP) service and a multicast domain name service (mDNS) wherein the DHCP service has priority relative to the mDNS service;
invoking at least one of the two or more network services to retrieve the configuration profile locator wherein, responsive to invoking the DHCP service and detecting the DHCP service retrieving the configuration profile locator before the mDNS service is invoked, preventing the mDNS service from being invoked; and responsive to retrieving the configuration profile locator, passing the configuration profile locator to a provisioning agent process configured to access the configuration file and configure the system in accordance with the SCP.

2. The method of claim 1, wherein configuring the system to include or support the two or more network services comprises configuring a management controller of the system to include or support two or more network services.

3. The method of claim 1, wherein the system is associated with a static IP address and wherein the two or more network services include at least one network service that is compatible with static IP addresses and at least one network service that is not compatible with static IP addresses.

4. The method of claim 3, wherein the at least one network service that is compatible with static IP addresses comprises a multicast domain name service (mDNS).

5. The method of claim 4, wherein the at least one network service that is not compatible with static IP addresses comprises a dynamic host configuration protocol (DHCP) service.

6. The method of claim 1, wherein the two or more network services include two or more DHCP services including a DHCP network service and a DHCPv6 network service.

7. The method of claim 1, wherein the method is performed in accordance with a provisioning feature enablement setting and wherein the provisioning feature enablement setting is selected from a group of enablement options including an enable once option and an enable once after reset option.

8. An information handling system, comprising:
a processor; and
a memory, accessible to the processor, including process executable instructions that, when executed by the processor, cause the system to perform operations including:
configuring the system with two or more network services for retrieving a configuration profile locator identifying a network-accessible configuration file containing a server configuration profile (SCP), wherein the two or more network services include a dynamic host configuration protocol (DHCP) service and a multicast domain name service (mDNS) wherein the DHCP service has priority relative to the mDNS service;

invoking at least one of the two or more network services to retrieve the configuration profile locator wherein, responsive to invoking the DHCP service and detecting the DHCP service retrieving the configuration profile locator before the mDNS service is invoked, preventing the mDNS service from being invoked; and responsive to retrieving the configuration profile locator, passing the configuration profile locator to a provisioning agent process configured to access the configuration file and configure the system in accordance with the SCP.

9. The information handling system of claim 8, wherein configuring the system to include or support the two or more network services comprises enabling a management controller of the system to include or support two or more network services.

10. The information handling system of claim 8, wherein the system is associated with a static IP address and wherein the two or more network services include at least one network service that is compatible with static IP addresses and at least one network service that is not compatible with static IP addresses.

11. The information handling system of claim 10, wherein the at least one network service that is compatible with static IP addresses comprises a multicast domain name service (mDNS).

12. The information handling system of claim 11, wherein the at least one network service that is not compatible with static IP addresses comprises a dynamic host configuration protocol (DHCP) service.

13. The information handling system of claim 8, wherein the two or more network services include two or more DHCP services including a DHCP network service and a DHCPv6 network service.

14. The information handling system of claim 8, wherein the operations are performed in accordance with a provisioning feature enablement setting and wherein the provisioning feature enablement setting is selected from a group of enablement options including an enable once option and an enable once after reset option.

* * * * *